L. E. GUESS.
TIRE INFLATING APPARATUS.
APPLICATION FILED MAY 5, 1916.
1,226,507.
Patented May 15, 1917.
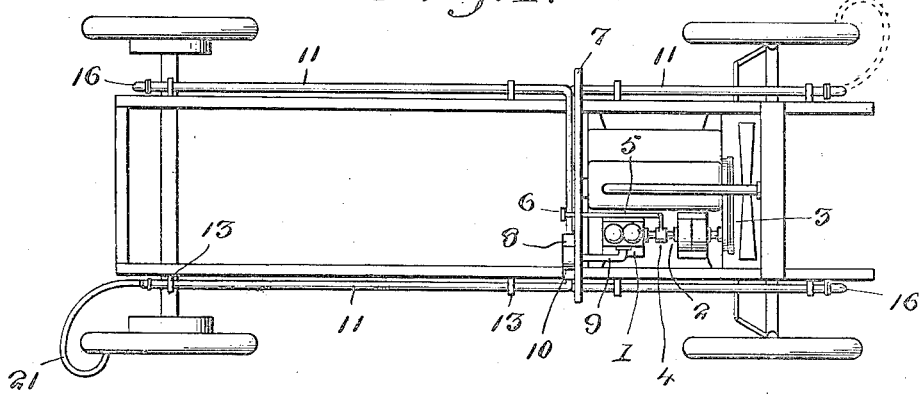
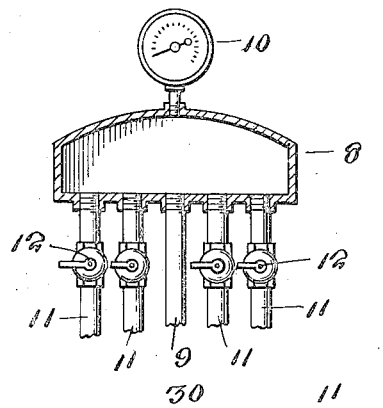
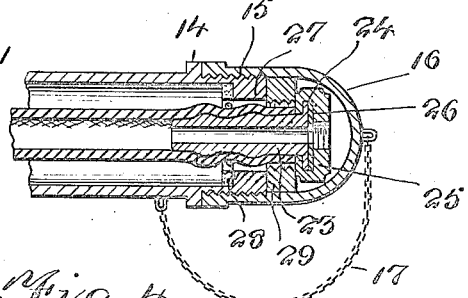
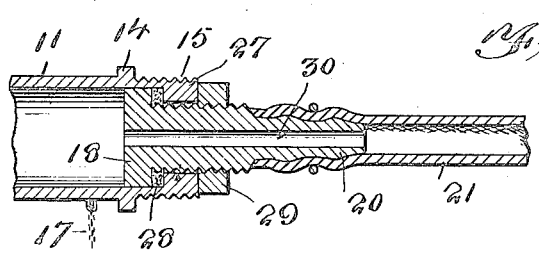
Inventor
L. E. Guess
By Victor J. Evans
Attorney
Witnesses

UNITED STATES PATENT OFFICE.

LEARNER E. GUESS, OF MARION, KENTUCKY.

TIRE-INFLATING APPARATUS.

1,226,507. Specification of Letters Patent. Patented May 15, 1917.

Application filed May 5, 1916. Serial No. 95,652.

*To all whom it may concern:*

Be it known that I, LEARNER E. GUESS, a citizen of the United States, residing at Marion, in the county of Crittenden and State of Kentucky, have invented new and useful Improvements in Tire-Inflating Apparatus, of which the following is a specification.

This invention relates to tire inflating apparatus, the object in view being to provide apparatus of the character referred to entirely mounted upon and carried by the frame or chassis of a motor vehicle, the same including an air pump adapted to be actuated by a rotary shaft associated with the engine of the vehicle, an air distributing chamber supplied by said pump, pipes leading from said distributing chamber to points adjacent to the wheels of the machine, and flexible tubes having a novel relation to said pipes, the apparatus as a whole being designed in such manner that any one or more of the tires may be inflated without disturbing the other tires.

A further object in view is to provide a novel connection between the pipes and flexible tubes, whereby the latter are normally housed within the pipes when not in use.

A further object of the invention is to provide a novel connection between each pipe and the respective flexible tube, whereby a tight joint is insured between said members when the parts are in readiness for inflating a tire.

With the above and other objects in view, the invention consists in the novel construction, combination and arrangement of parts, as herein described, illustrated and claimed.

In the accompanying drawings:—

Figure 1 is a plan view of a sufficient part of the chassis of an automobile to show the present invention in its applied relation thereto.

Fig. 2 is a sectional view of the distributer, showing the several pipes and other parts associated therewith.

Fig. 3 is an enlarged diametrical section through the end portion of one of the pipes and also one of the flexible tubes, showing the relation of the parts intimately associated therewith.

Fig. 4 is a similar view showing the position assumed by the parts when the flexible tube is drawn outwardly for use in inflating a tire.

The apparatus contemplated in this invention comprises an air pump 1 which is shown for convenience as arranged to be actuated by the magneto shaft 2 driven from the engine shaft by the usual gears in the timing gear casing 3. The pump 1 is adapted to be thrown into and out of engagement with the magneto shaft 2 by means of a clutch member 4 which is shown as capable of being operated by the driver without moving from his seat by means of a connecting rod 5 having a handle 6 at the inner end thereof adjacent to the dash 7.

Secured to the dash or other convenient point or support is a distributer box 8 connected with the pump 1 by means of a pipe 9 through which the compressed air is forced into the distributer 8.

The distributer 8 is equipped with an air pressure gage 10 so that the operator may know when a tire has been sufficiently inflated. In addition to the pipe 9 which is shown as entering the bottom of the distributer 8, there are other outlet pipes 11 each controlled by a stop cock 12 to prevent possibility of leakage when only one tire, for example, is being inflated, the stop cocks 12 preventing the air under pressure from escaping through the pipes which are not in use. As shown in Fig. 1, the pipes 11 are extended along the chassis in parallel relation thereto, each pipe being supported in fixed relation to the frame by means of suitable eyes or keepers 13. Each pipe 11 terminates adjacent to one of the wheels and is formed with an annular shoulder 14 beyond which the end portion of the pipe is screw threaded at 15 to receive a cap 16, the latter being connected by an anchor chain 17 to the body of the pipe 11 so that said cap will not be lost when removed. Slidingly mounted in each pipe 11 is a nozzle 18 having a threaded portion 19 and a reduced and fluted or corrugated end portion 20 around which is disposed one end of a flexible tube 21, 22 designating a suitable pointer which encircles the end of the tube 21 and the reduced extremity 20 of the nozzle to avoid any possibility of a leak. The opposite end of the flexible tube 21 is similarly confined around an end fitting 23 having at its outer extremity a flange 24 which is surrounded by an internally threaded valve attaching cap 25 adapted to be screwed upon the valve tube of the adjacent tire preparatory to inflating the same. 26 designates a packing washer within the screw cap 25 to provide an air tight joint.

Each pipe 11 is also formed with an internal annular shoulder 27 behind which is a packing washer 28. 29 designates a clamping nut which is utilized in the manner illustrated in Fig. 4, that is to say, when the flexible tube 21 and the parts connected therewith are drawn outwardly from the housed position illustrated in Fig. 2 to the useful position illustrated in Fig. 4, the nut 29 is screwed up tightly against the extremity of the pipe 11 thereby compressing the packing washer 28 and forming an air tight joint to prevent air from escaping around the nozzle 18. The nozzle is of course formed with a central longitudinal bore 30 to allow the air to pass from the pipe 11 to and through the flexible tube 21. After the tire has been inflated, the nut 29 is moved out of threaded engagement with the nozzle 18 and then the flexible tube 21 with the parts attached thereto is moved inwardly to the housed position illustrated in Fig. 3. The cap 16 is then replaced and screwed upon the end of the pipe 11.

By the construction above described, the pipes 11 not only form housings for the flexible tubes but they keep the flexible tubes in good condition, protect them against the elements and dust, dirt and the like and they also form conduits which carry the compressed air from the distributer to the flexible tubes and to the tires.

I claim:—

1. Tire inflating apparatus for motor vehicles comprising an air pump, means adapting said pump to be driven by the vehicle motor, a distributer box into which said pump discharges, pipes leading from said box and terminating adjacent to the vehicle wheels, each of said pipes having an open end and an internal annular shoulder, a flexible air tube movable into and out of the open end of said pipe, a fitting at the inner end of said flexible tube having an annular shoulder in opposed relation to said internal shoulder, and means for forcing one of said shoulders toward the other to form an air tight joint between said pipe and tube.

2. Tire inflating apparatus for motor vehicles comprising an air pump, means adapting said pump to be driven by the vehicle motor, a distributer box into which said pump discharges, pipes leading from said box and terminating adjacent to the vehicle wheels, each of said pipes having an open end and an internal annular shoulder, a flexible air tube movable into and out of the open end of said pipe, a fitting at the inner end of said flexible tube having an annular shoulder in opposed relation to said internal shoulder, means for forcing one of said shoulders toward the other to form an air tight joint between said pipe and tube, said distributer box being mounted on the dash, an air pressure gage connected with said box and mounted in rear of the dash, and means controlled in rear of the dash for throwing the pump into and out of operation.

In testimony whereof I affix my signature.

LEARNER E. GUESS.

Witnesses:
LEAFFA WILBORN,
GUSSIE BURGET.